United States Patent [19]

Inda et al.

[11] Patent Number: 5,240,288
[45] Date of Patent: Aug. 31, 1993

[54] DOUBLE AIR DUCT BOOT

[75] Inventors: John P. Inda, Shawnee; Joseph J. Inda, Tecumseh, both of Okla.

[73] Assignee: General Plastics, Inc., Shawnee, Okla.

[21] Appl. No.: 870,930

[22] Filed: Apr. 20, 1992

[51] Int. Cl.[5] .................................. F16L 35/00
[52] U.S. Cl. .................................. 285/3; 285/12; 285/176; 285/197; 285/423; 29/412; 138/109; 138/89
[58] Field of Search .................. 285/3, 4, 176, 177, 285/12, 197, 198, 199, 423; 29/412, 413, 414; 138/109, 94, 89; 264/157, 159; 454/305, 296

[56] References Cited

U.S. PATENT DOCUMENTS

| D. 314,820 | 2/1991 | Sullivan | D23/393 |
|---|---|---|---|
| 24,660 | 7/1859 | Potts | |
| 567,231 | 9/1968 | Glauber | |
| 925,762 | 6/1909 | Eager | |
| 1,908,821 | 5/1933 | Cornell, Jr. | 285/197 |
| 2,086,007 | 7/1937 | Tompkins | 285/105 |
| 2,215,318 | 9/1940 | Bristol | 138/75 |
| 3,610,288 | 10/1971 | Carr | 138/96 R |
| 3,645,566 | 2/1972 | Dyck | 285/197 |
| 4,067,353 | 1/1978 | DeHoff | 285/197 X |
| 4,491,349 | 1/1985 | Rice et al. | 285/197 |
| 4,750,411 | 6/1988 | Eversole | 285/4 X |
| 4,773,197 | 9/1988 | Sullivan | 52/221 |
| 5,036,636 | 8/1991 | Hasty | 285/4 X |
| 5,080,403 | 1/1992 | Paolyccio | 285/189 X |

FOREIGN PATENT DOCUMENTS 871635 6/1961 United Kingdom ................ 285/199

OTHER PUBLICATIONS

Exhibit A-Photograph of prior air duct riser.
Exhibit B-Photograph of prior air duct riser.
Sales information from Northern Pipe Products and GPK Products, Inc. (Undated but believed to be prior art to the present application).

Primary Examiner—Dave W. Arola
Assistant Examiner—Heather Chun
Attorney, Agent, or Firm—Dougherty, Hessin, Beavers & Gilbert

[57] ABSTRACT

A double air duct boot which includes a pair of identical opposed severable parts, joined through a central section. The two parts are geometrically symmetrical about the central section which joins the two parts. The central section includes a pair of identical halves joined at a central plane. The central section includes a pair of opposed segments of a cylinder constituting spaced, arcuate opposed side walls and a pair of opposed transverse walls joining the opposed arcuate side walls and lying in parallel planes. The central section is completed by a pair of elongated parallel end walls which extend perpendicular to the transverse walls to complete the closure of the central section. Each of the opposed severable parts includes a tapered riser section joined to the central section through an intermediate, optionally usable, arcuate duct mating section.

2 Claims, 2 Drawing Sheets

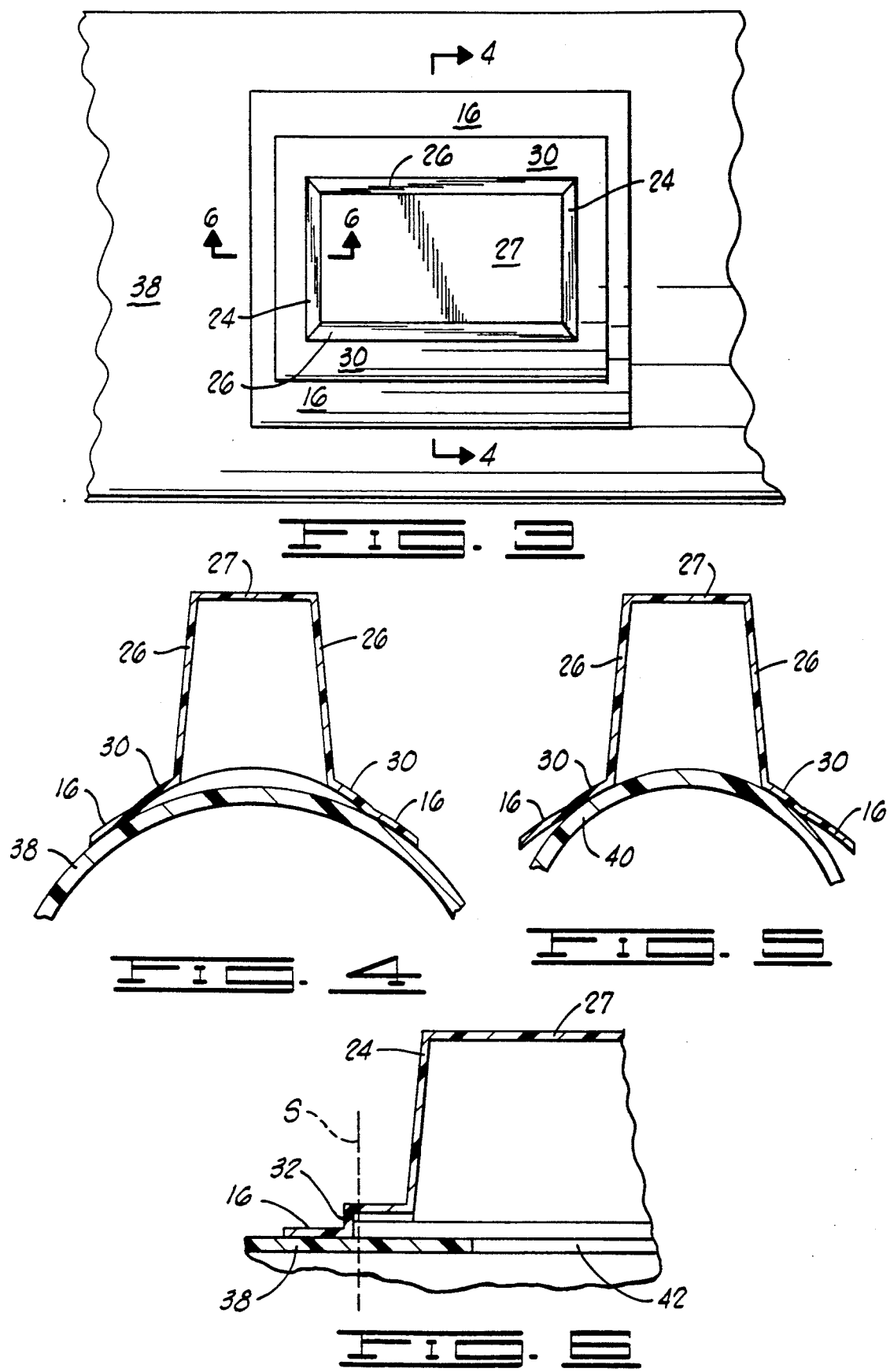

5,240,288

DOUBLE AIR DUCT BOOT

FIELD OF THE INVENTION

This invention relates to an air duct boot connectable to a subfloor air duct to provide an upwardly extending vent riser delivering heated or cooled air to an edifice.

BACKGROUND OF THE INVENTION

1. Brief Description Of The Prior Art

Various types of boots or risers are provided for the purpose of conveying air from a horizontally extending, subfloor heating and air conditioning duct to a register opening at floor level within an edifice which is to be heated or cooled. In one type of system now in use, the riser fitting is connected to one end of a subfloor air duct, and both the riser and duct are cemented in the pad or slab as the building is constructed. The vertically extending riser is cut off at a length such that its upper end terminates at floor level and can receive an air register grill or grate. Such vertically extending risers are in some cases made of metal, and in other instances are constructed of plastic.

In another type of heating and air conditioning system, the subfloor ducting extends around the perimeter of the subfloor structure and the risers are connected to the duct at a point on the perimeter intermediate its length. Each riser extends upwardly to floor level, and both the riser and the perimeter duct are embedded within the concrete slab or pad of the building.

2. Brief Description Of The Present Invention

The present invention provides a synthetic resin air duct boot which can be divided or severed along a central plane so as to provide two separate identical, individually usable air duct boots. Each of these can be used on either of two different sizes of air ducts to provide a riser extending upwardly to floor level for the purpose of conveying hot or cool air to the interior of the building in which they are located. The geometric configuration of the double air duct boot is such that it can be quickly and easily blow molded, so as to provide two easily severable parts of the molded product which are individually and independently usable. Each can be connected to an air duct to provide a riser for the conveyance of conditioned air to floor level within a building erected thereabove.

Broadly described, the double air duct boot of the invention includes a pair of identical opposed severable parts joined to each other through an integrally formed central section. The two parts are geometrically symmetrical about the central section by which the two parts are joined.

The central section of the double air duct boot includes a pair of identical halves joined to each other at a central plane. The central section includes a pair of opposed segments of a cylinder constituting a pair of spaced, opposed, side walls and a pair of opposed, spaced parallel transverse walls which join the opposed side walls. The central section is completed by a pair of elongated, spaced parallel end walls which extend perpendicular to the transverse walls and lie between the two cylindrical side walls to complete the closure of the central section. Each of the opposed parts located at opposite sides of the central section includes a tapered riser section joined to the central section through an intermediate, optionally usable, arcuate, duct mating section.

An important object of the present invention is to provide a double air duct boot which provides to a contractor heating and air conditioning for an edifice and the ability to provide two vertically extending air risers from a single inventoried element simply by severing two parts of the double air duct boot, and using each part independently as a separate riser.

An additional object of the invention is to provide a double air duct boot which can be used to provide a pair of closely fitting, substantially air proof, non-leaking risers secured to an air duct and extending upwardly to floor level in a building to be air conditioned and heated through the use of the system including the duct and riser.

A further object of the invention is to provide a double air duct boot manually divisible into two parts, with each such part susceptible to being slightly modified to permit each part to be selectively joined with a tight fit to an air duct which may be either one of two different diametric sizes.

Additional objects and advantages of the invention will become apparent as the following detailed description of the invention is read in conjunction with the accompanying drawings which illustrate a preferred embodiment of the invention.

GENERAL DESCRIPTION OF THE DRAWINGS

FIG. 3 is a top plan view of the boot or riser secured to the duct as shown in FIG. 2, as such would appear when viewed from above.

FIG. 4 is a sectional view taken along line 4—4 of FIG. 3.

FIG. 5 is a sectional view similar to FIG. 4, but taken through a duct pipe of smaller diameter fitted with a riser provided by the present invention.

FIG. 6 is a sectional view taken alone line 6—6 of FIG. 3.

DETAILED DESCRIPTION OF A PREFERRED EMBODIMENT OF THE INVENTION

Figure 1:
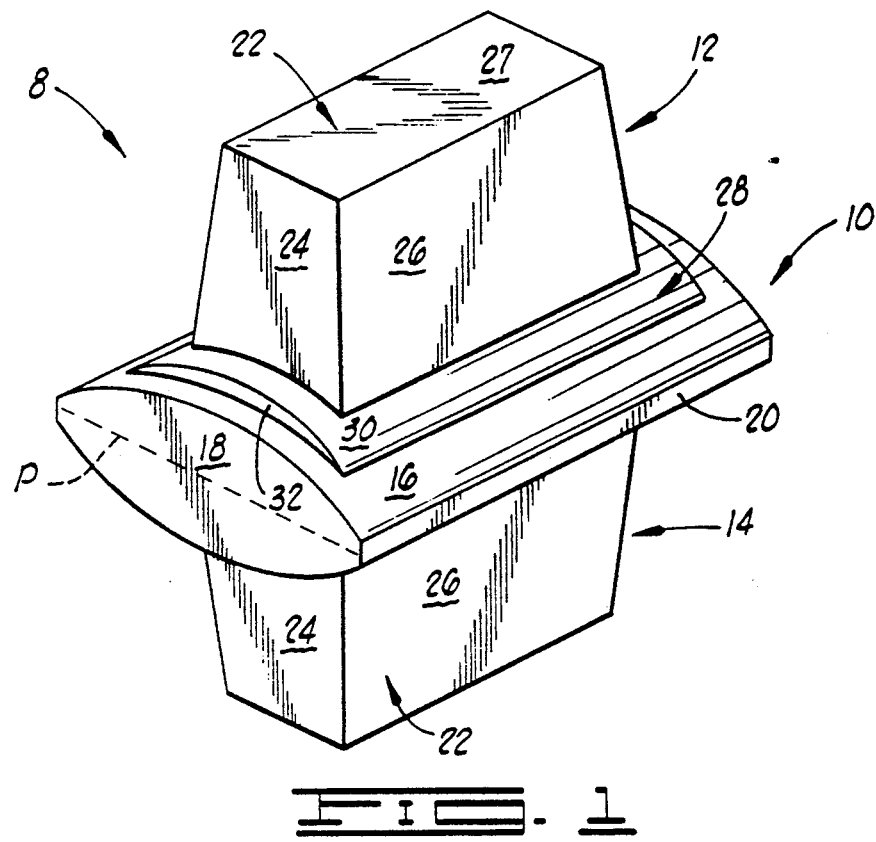
FIG. 1 is a perspective view of the double air duct boot constructed in accordance with the present invention. A dashed line appearing on this view of the double air duct boot indicates a parting plane where the two symmetrical opposed parts of the air duct boot are severed from each other in preparation for use.

Referring initially to FIG. 1 of the drawings, shown therein is a double air duct boot 8 constructed in accordance with the present invention. The double air duct boot 8 appears as it is constructed by a blow molding procedure, and as it is to be stocked or inventoried by the heating and air conditioning contractor prior to being divided into two identical parts for individual usage in a heating and air conditioning system. The double air duct boot 8 includes a central section denominated generally by reference numeral 10, and a pair of identical, opposed, severable riser parts 12 and 14 which are joined to each other through the central section. In the end use of the double air duct boot 8, each of the parts 12 and 14 is employed as a tubular boot or riser which is connected to a subfloor air duct, and functions to convey hot or cold air from the duct to floor level at the upper side of a concrete slab or pad in which the air duct is located.

The central section 10 of the double air duct boot 8 includes a pair of identical halves which are joined to each other at a central parting plane. Each of these identical halves of the central section 10 includes a side wall formed as a part of figure of revolution so as to constitute a segment of a cylinder. One of these arcuate semicylindrical side walls of the central section appears in FIG. 1 and is there denominated by reference numeral 16. Each of the semicylindrical side walls 16 has an internal semicylindrical inwardly facing concave surface, as well as a semicylindrical outwardly facing convex surface which is depicted in FIG. 1. Both of the semicylindrical side walls 16 of the central section 10 are identically shaped.

The semicylindrical side walls 16 are joined by a pair of integrally molded parallel transverse walls 18 which are located at opposite ends of the central section 10, and by a pair of elongated, parallel end walls 20. The walls 20 extend normal to the parallel transverse walls 18, and also function to interconnect the two semicylindrical side walls 16. As a result of the blow molding procedure, the central section has an interior which is shaped substantially identical to the exterior. This is to say that each of the walls 16, 18 and 20 making up the central section has an inner surface which is substantially identical in configuration to the outer surface thereof.

Each of the identical, opposed riser parts 12 and 14 which are joined to each other through the central section 10 includes a generally frustopyramidal tapered riser section 22. Each of these riser sections 22 includes a pair of spaced, convergent end walls 24, and a pair of spaced, convergent side walls 26 which are interconnected by an outer closure wall 27. These can best be perceived by referring to either FIG. 1 or FIG. 2, in conjunction with FIG. 3. The frustopyramidal tapered riser section 22 is joined to the central section 10 through an intermediate, arcuate duct mating section designated generally by reference numeral 28. Each intermediate, arcuate duct mating section 28 includes an arcuate duct-contacting outer wall 30, which is configured as a segment of a cylinder, and a pair of opposed, parallel end closure walls. The end closure walls 32 extend between the respective arcuate, semicylindrical duct-contacting outer wall 30, and the outer surface of one of the semicylindrical side walls 16 of the central section 10.

It will be noted when referring to FIGS. 4, 5 and 6 that the semicylindrical duct-contacting outer wall 30 of each intermediate arcuate duct mating section 28 is formed on a smaller radius than is the semicylindrical side wall 16 of the intermediate section. The differing radii of the two wall structures 30 and 16 are selected to correspond to the diametric sizes of two different sizes of air ducts which are expected to be frequently encountered by the contractor in the carrying out of various installations in new construction projects. Two such air ducts of differing diameter are illustrated in the drawings, and are there denominated by reference numerals 38 and 40.

USE AND OPERATION OF THE INVENTION

The double air duct boot of the invention is stocked and inventoried by the contractor in the form depicted in FIG. 1. At the situs of use of the double air duct boot, the contractor can then manually sever the air duct boot along the parting plane "P" which is shown by a dashed line in FIG. 1. This reference line shows the line of cut at which the two symmetrical and identical parts of the double air duct boot are separated from each other. After the contractor has severed the two parts of the double air duct boot from each other, the contractor will then need to determine which of the options available with each of the two identical parts is to be used. By the two options available in the case of each of the two parts is meant the option of using either one of the parts on a relatively large diameter air duct, or upon an air duct having a smaller diameter.

Figure 2:
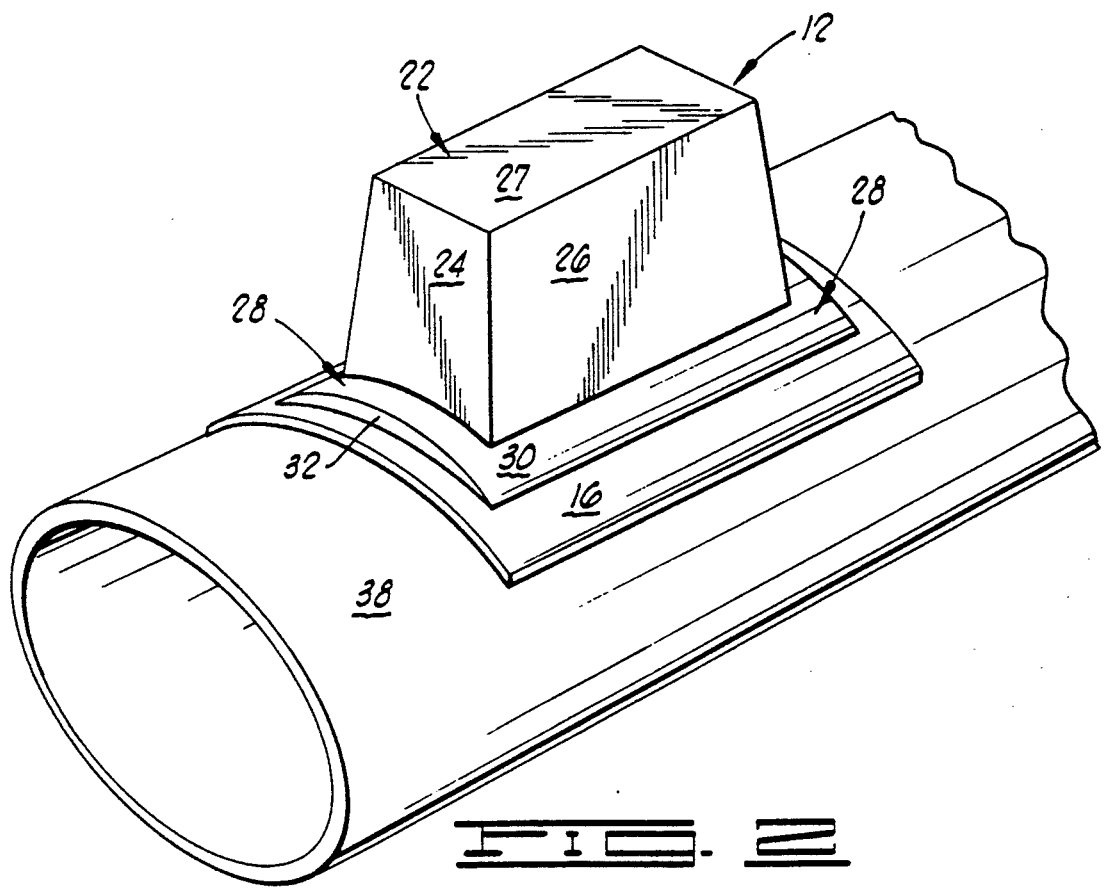
FIG. 2 is a perspective view illustrating the manner in which one-half of the air duct boot is used to provide a hot and cold air riser extending upwardly from a subfloor duct to a location adjacent the level of the floor in which the duct and riser are to be located.

Both usages are shown in FIGS. 4 and 5 of the drawings in the manner, and this optional usage will be better understood in referring to FIG. 6. When one of the halves of the air duct boot are to be used on a large diameter duct, the contractor then simply cuts away each of the transverse walls 18 forming portions of the central section 10 so as to leave only the arcuate inner surface of the arcuate semicylindrical side wall 16 of the central section exposed. In other words, the entire concave inner surface of the semicylindrical side wall 16 on the half of the double air duct boot which is in use which is exposed will fit flush against the convex outer peripheral surface of a generally cylindrical air duct boot 38 as shown in FIG. 2 of the drawings. When the half of the double air duct boot which is to be used has been trimmed so as to be able to fit in this fashion against the outer surface of the duct, a suitable solvent or cement is used to cement this half of the air duct boot in place over a large opening in the duct which communicates the interior of the generally frustopyramidal tapered riser section 22 with the interior of the duct through the intermediate arcuate duct mating sections 28. The final arrangement in which the half of the double air duct being used has been fitted and sealed to the outer peripheral surface of a large diameter air duct 38 is shown in FIGS. 2, 3 and 4 of the drawings.

After the half of the air duct boot in use has been placed in this position on the air duct 38, the closure wall 27 is removed and portions of the convergent end walls 24 and convergent side walls 26 are also removed in order to make the frustopyramidal tapered riser section 22 terminate at a level which is even with the floor level of the edifice to be erected over the foundation pad or slab in which the duct and riser system for supplying conditioned air is to be located. Cement or concrete is used to embed the duct 38 and the riser section 22 in the floor slab or pad in conventional fashion. A suitable register grill or grate is then secured across the open upper end of the riser section 22, and the installation is completed. It will be understood, of course, that the second half of the double air duct boot resulting from severance of the two parts along the plane in which the dashed line "P" lies, can be used to provide another riser secured to the same peripheral duct pipe as that to which the riser illustrated in FIG. 2 has been secured. The contractor has not had to handle (until the time of severance), however, the two different parts, but the two parts thus provided are, prior to that time, an integral whole and can be carried and transported more easily.

In the case of a smaller diameter section of air duct, such as the air duct 40 shown in FIG. 5, the contractor will then need to cut through the severed half of the double air duct boot which is to be used along two spaced, parallel diametric planes such as that which contains the dashed line shown in FIG. 6. In other words, by cutting the half of the double air duct boot along two parallel planes such as this, the end walls 32 of the intermediate duct mating section will be removed, as well as an end portion of the arcuate semicylindrical side wall 16 of the central section 10. There will then be exposed for contact with the outer periphery of the smaller diameter duct 40, the inner surface of the smaller radiused arcuate semicylindrical duct-contacting outer wall 30 of the boot half which has been developed by the initial severance, and the smaller radiused arcuate semicylindrical duct-contacting outer wall 30 can then be bonded by suitable adhesive over an opening 42 formed through the smaller diameter duct so that it occupies the position illustrated in FIG. 5.

It will be perceived from the foregoing description of the invention and the discussion of the manner in which it is used, that the present invention provides advantage in the manufacturing process for the reason that a blow molding procedure can be used to make the double air duct boot containing two useful parts in a single molding step. The invention is also highly useful in increasing the versatility of the product and the ease with which it can be used by a contractor to confront and make a satisfactory installation in the case of air ducts which are of different diameters.

Although a preferred embodiment of the invention has been herein described in order to illustrate the principles of the invention adequately to enable the practice of the invention, it will be understood that various changes and innovations, which depart from the precisely illustrated structure and the dimensions herein described, can be effected without departure from the basic principles of the invention. Changes and innovations of this type are therefore deemed to be circumscribed by the spirit and scope of the invention as defined by the appended claims, or reasonable equivalents thereof, at such time as the claims are interpreted and construed.

What is claimed is:

1. A double air duct boot comprising:
    a hollow central section which includes:
        a pair of opposed, spaced, arcuate side walls each formed as a segment of a cylinder, with each formed on the same radius of curvature, and said opposed side walls having the concave sides of the two arcuate side walls facing each other;
        a pair of opposed, spaced, parallel transverse walls joining the opposed side walls; and
        a pair of opposed, spaced, parallel end walls each extending perpendicular to the transverse walls and each joining the opposed side walls and each having its opposite ends connected to the transverse walls;
    said central section made up of said side walls, transverse walls and end walls being formed as two identical halves joined at a central parting plane lying midway between said spaced semicylindrical side walls;
    a pair of opposed, hollow parts molded integrally with, and connected to, said central section, each of said parts including:
        a hollow, frustoconical, tubular riser section having a rectangular cross-section over its length; and
        an intermediate section formed integrally with, and interconnecting, said frustoconical, tubular riser section and said central section.

2. A double air duct boot as defined in claim 1 wherein each of said intermediate sections includes an arcuate outer wall formed on a segment of a cylinder, and formed on a smaller radius of curvature than the arcuate side walls of said central section, said intermediate section further including a pair of opposite end walls extending between said arcuate semicylindrical outer wall of said intermediate section and one of the arcuate semicylindrical side walls of said central section.

* * * * *